Figure 1:
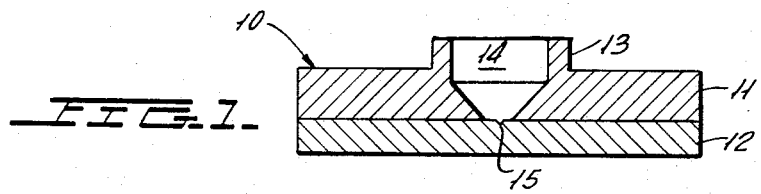

Dec. 19, 1967   C. B. GWYN, JR   3,358,364
METHOD OF MAKING ELECTRICAL CONTACTS BY
COLD WELDING SOLDERING AND COINING
Filed April 25, 1963

INVENTOR.
CHILDRESS B. GWYN, JR.
BY
OSTROLENK, FABER, GERB & SOFFEN
ATTORNEYS 3,358,364
METHOD OF MAKING ELECTRICAL CONTACTS BY COLD WELDING SOLDERING AND COINING
Childress B. Gwyn, Jr., Export, Pa., assignor, by mesne assignments, to Talon, Inc., a corporation of Pennsylvania
Filed Apr. 25, 1963, Ser. No. 274,334
6 Claims. (Cl. 29—630)

This invention relates to a method of forming permanent unitary electrical contact elements, and more particularly to such a method for forming rivet or projection welding type electrical make-and-break contacts.

It is known to make composite rivet and projection welding type contacts by initially producing a suitable silver or other contact face member by punching, blanking or like operations and thereafter bonding a base metal support thereto. In accordance with known procedures, a silver facing, for example, may be coated with a flux medium and a suitably proportioned processed brazing or soldering material then coated upon the flux, prior to superimposing the base metal support thereon. While these members are maintained in properly positioned relationship within a jig or other fixture they are heated, in a neutral or reducing atmosphere, at such a temperature and for a sufficient length of time to cause the brazing or soldering medium to melt and flow and to thereby wet and alloy with or otherwise integrate the silver facing and the base metal supporting member. The parts are then maintained in position until they have been cooled below the melting and flow points of the brazing or soldering medium, and the resulting composite contact element is thereafter removed from the mounting jig. This procedure, is, however, time consuming and relatively complex and is additionally subject to contamination of the working surfaces of the silver facing by the brazing or soldering media which may seriously impair, if not destroy, the utility of the contact for electrical make-and-break contact purposes.

It is also known to manufacture electrical welding contacts by making an overlay or sandwich of the silver or other facing element and the base metal supporting member, blanking the composite contact therefrom and subsequently coining the contact to the final dimensions desired. While such operations can produce satisfactory contacts there is a concomitant production of relatively large amounts of scrap resulting from the blanking and trimming steps, introducing the necessity to reclaim the silver or other facing material from the skeleton remaining from the initial blanks.

Yet another procedure for manufacturing projection welding make-and-break contacts is the so-called fusion or puddling techniques disclosed in my prior Patents 2,049,771 and 2,199,240. These procedures are limited to use of contact facing materials which can be melted without changing their desired characteristics and which have lower melting points than the base metal supporting members employed; moreover, such procedures are in general limited to the projection welding contacts having solely two component parts, the silver or suitable electrical contact material facing and the base metal backing.

Various methods for effecting welding and/or alloying of electrical contact components by cold working have recently been discovered. Such methods have been effective to produce what may be termed atomic bonding between tubular or rivet-shaped backing members and appropriate contact facing members resulting in the formation of a composite contact element, which may be handled as one member. It is, however, frequently desirable to strengthen the bond between the members of such a composite element to improve its resistance to the mechanical, electrical and thermal stresses to which it is subsequently subjected.

It is among the objects of the present invention to provide a method for making a rivet or projection welding type electrical make-and-break contact element which permanently integrates the individual components of the contact into a unitary element.

Other objects and advantages of the invention will be apparent from a consideration of the following detailed description thereof.

It has now been found that a permanent unitary electrical make-and-break contact element may be formed by initially disposing a contact face member and a backing member in aligned relation, and subjecting the aligned members to pressure in order to cold weld and/or alloy the members together and thereby cold form a bonded composite contact element. The contact face member may be constituted of silver, gold, or a platinum group metal, or of a ductile alloy of such a material and the backing member aligned therewith may be of copper, nickel, a ferrous metal, aluminum, or of an alloy of such a material, e.g., Monel metal. In accordance with the invention, the backing member is provided having a configuration such that the composite contact element thus formed has a recess therein extending through the backing member to the interface thereof with the contact face. A tin or silver-containing solder is then placed in such recess and the composite contact element is heated to a temperature of at least 400° F., the solder diffusing across the interface between the contact face and backing members and integrating such members into a permanent unitary contact.

The brazing or soldering action thus obtained substantially permanently unites the components of the contact member and provides a contact having vastly improved resistance to mechanical, electrical and thermal stresses. It is relatively difficult to produce adequate cold welding of two materials having widely divergent melting points and other physical characteristics such as silver and steel; such composite contact elements, may, however, be temporarily "tacked or stuck" by cold welding and thereafter permanently united by soldering or brazing in accordance with this invention.

The invention will be more clearly understood from a consideration of the accompanying drawing, FIGURES 1 to 4 of which are schematic sectional views illustrating the various stages of the formation of a projection welding contact element in accordance with one embodiment of the invention.

In FIGURE 1 a typical composite contact element 10 is illustrated comprising a backing member blank 11, e.g., of steel, and a contact face member 12, e.g., of silver, welded and/or alloyed therewith by cold welding. Preferably, the cold welding procedure employed is that disclosed in my copending application Ser. No. 228,116 filed on Oct. 3, 1962, in which the members 11 and 12 are superposed and subjected to a compressive force of at least one ton per square inch, the force being rapidly applied to the thus aligned members at a velocity of at least 10 inches per second to form the composite rivet 10.

The tubular portion 13 of the contact backing member is formed with a recess 14 extending completely through the material of the steel blank 11 to the interface between such blank and the silver face member 12. As indicated at 15 in FIGURE 1, the recess may, if desired, extend slightly into the body of the face member 12 in order to permit and facilitate flow of the subsequently applied brazing material across the interface between members 11 and 12.

Figure 2:
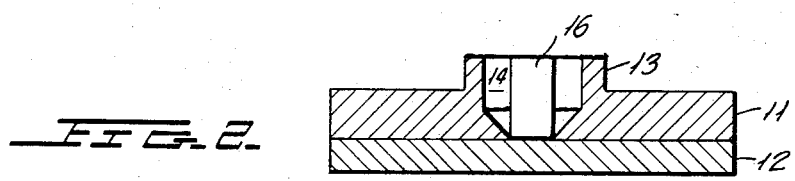
Figure 3:
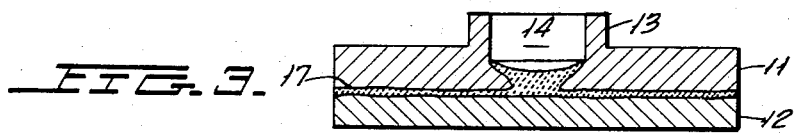
Figure 4:
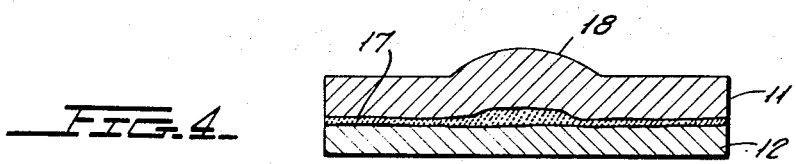

A brazing or soldering segment or slug 16 is thereafter placed within the recess 14 (FIGURE 2). The brazing medium is suitably constituted of any of the well known silver or tin-containing solders having melting points in excess of about 400° F., e.g., the Easy-Flo brazing alloys and Sil-Fos brazing alloy manufactured by Handy and Harman. The composite element is thereafter heated to a temperature of from about 400° F. to 1500° F., thereby melting the brazing medium 16 and effecting flow thereof across the interface between the members 11 and 12, forming an alloying layer 17 therebetween (FIGURE 3). After cooling the integrally bonded contact element assembly may be coined to a finished shape suitable for forming a welding projection 18 (FIGURE 4) for the desired projection welding contact element.

In the coining step a coining die having a concave surface is forced against the tubular portion 13 of the integrally bonded contact element to fold such portion over the recess 14 and thereby form the desired welding projection 18 on the composite element. The walls of the tubular portion thus envelop the alloying layer brazed within recess 14 and flow upon themselves to produce a homogeneous welding projection.

The procedure described hereinabove is particularly advantageous in that the contour and thickness of the silver or other contact material face member is determined at the same time and by the same operation by which the tubular steel or other metal backing member is shaped, thus effecting improved economy of manufacture.

Moreover, as described above, the brazing or soldering material is readily positioned by simply dropping or blanking it into the recess provided in the cold-welded composite contact element. It is not therefore necessary to carefully position such brazing material between the two members, as required by prior art procedures. In fact, the method of the present invention eliminates the necessity for positioning the members in a jig or fixture which positions them for the brazing operation. Such fixtures are often expensive to make and maintain and in addition, due to their bulk and weight, provide a considerable amount of heat loss.

On the other hand, while the product to be brazed in accordance with the present invention is comprised of two members, the initial cold welding step facilitates handling the same as a single unitary element without necessitating the use of any positioning jigs or fixtures. The process of the invention may actually be performed in bulk lots, as by placing the composite contacts directly on a movable belt or in thin metal trays, without substantial heat losses.

Since certain changes may be made in carrying out the above method without departing from the scope of the invention, it is intended that all matter contained in the above description shall be interpreted as illustrative and not in a limiting sense.

The embodiments of the invention in which an exclusive privilege or property is claimed are defined as follows:

1. A method of forming an integral make-and-break electrical contact element comprising:
    (a) disposing a substantially planar contact face member constituted of silver, gold, a platinum group metal, or alloys of such materials, adjacent a backing member for the electrical contact element constituted of copper, nickel, a ferrous metal, aluminum, or alloys of such materials, said backing member having a substantially planar shape and incorporating a recess extending therethrough and defined by annular tubular walls upstanding from one face of said backing member;
    (b) cold welding the adjacent contact face and backing members in order to form a bonded composite contact element, the tubular walls of said backing member being disposed remote from the adjacent face of the contact face member bonded thereto and the recess in said backing member communicating with the interface between the respective members;
    (c) placing a soldering element of a tin- or silver-containing solder within said recess;
    (d) heating said composite contact element to a temperature of at least 400° F. to effect diffusion of the solder across said interface, said solder integrating the contact face and backing members into a permanent unitary contact element; and
    (e) coining the composite contact element thus formed by forcing a coining die having a concave-forming surface against the upstanding tubular walls of the backing member to fold said walls over the recess defined thereby, the material constituting said walls flowing over itself to provide a homogeneous welding projection, whose outer surface has a substantially concave cross-section, upon said unitary contact element.

2. The method as defined in claim 1, in which the aligned contact face and backing member are subjected to a compressive force of at least one ton per square inch, said force being rapidly applied thereto at a velocity of at least 10 inches per second to form the bonded composite contact element.

3. The method as defined in claim 1, in which the contact face is constituted of silver, and the backing member is constituted of copper.

4. The method as defined in claim 1, in which the contact face is constituted of silver and the backing member is constituted of steel.

5. A method of forming an integral make-and-break electrical contact element comprising:
    (a) disposing a substantially planar contact silver face member, adjacent a steel backing member for the electrical contact element, said backing member having a substantially planar shape and incorporating a recess extending therethrough and defined by annular tubular walls upstanding from one face of said backing member;
    (b) cold welding the adjacent contact face and backing members by compressing them together with a force of at least one ton per square inch, said force being rapidly applied at a velocity of at least ten inches per second in order to form a bonded composite contact element, the tubular walls of said backing member being disposed remote from the adjacent face of the contact face member bonded thereto and the recess in said backing member communicating with the interface between the respective members;
    (c) placing a soldering element of a silver-containing brazing alloy within said recess;
    (d) heating said composite contact element to a temperature of from 400°–1500° F. to effect diffusion of the brazing alloy across said interface, said brazing alloy integrating the silver contact face and the steel backing members into a permanent unitary contact element; and
    (e) coining the composite contact element thus formed by forcing a coining die having a concave-forming surface against the upstanding tubular walls of the backing member to fold said walls over the recess defined thereby, the material constituting said walls flowing over itself to provide a homogeneous welding projection, whose outer surface has a substantially concave cross-section, upon said unitary contact element.

6. The method as defined in claim 5, in which the recess formed in said bonded composite contact element extends slightly into the body of the contact face member to facilitate flow of the subsequently applied brazing alloy across the interface between said contact face member and said tubular backing member.

References Cited

UNITED STATES PATENTS

| | | | |
|---|---|---|---|
| 1,970,022 | 8/1934 | Pietenpol et al. | 29—155.55 |
| 2,414,463 | 1/1947 | Gunn et al. | 29—155.55 |
| 2,987,815 | 6/1961 | Zeller | 29—500 |
| 2,830,920 | 4/1958 | Colson et al. | 29—470.1 |
| 3,191,274 | 6/1965 | Gwyn et al. | 29—155.55 |

FOREIGN PATENTS 815,136   6/1959   Great Britain.

JOHN F. CAMPBELL, *Primary Examiner.*

A. M. HORTON, *Examiner.*

R. W. CHURCH, *Assistant Examiner.*